Jan. 20, 1931. J. B. BROILLET 1,789,804
SAW
Filed Dec. 24, 1927 2 Sheets-Sheet 1
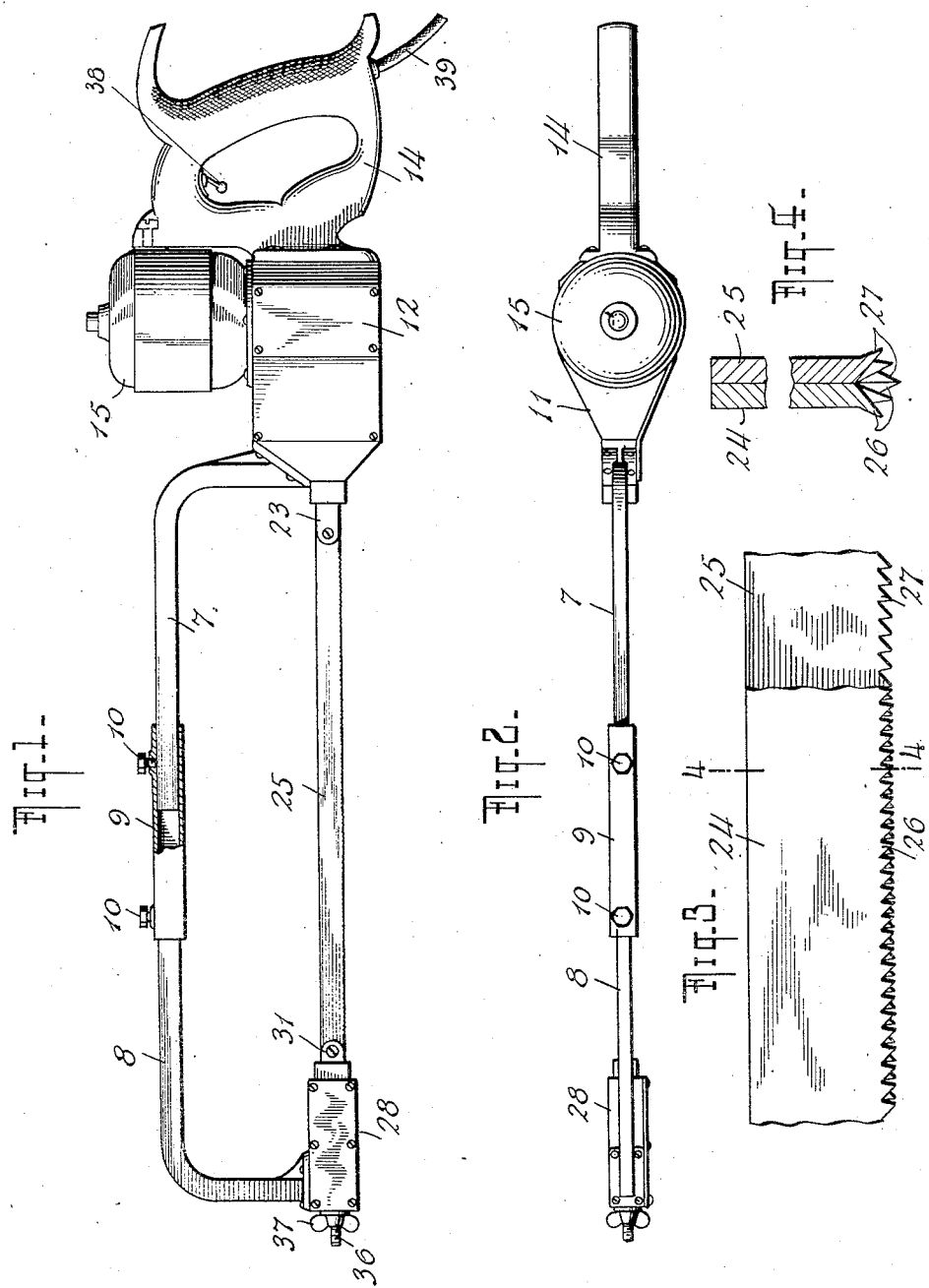
INVENTOR
JEAN B. BROILLET
BY
ATTORNEY Jan. 20, 1931.  J. B. BROILLET  1,789,804
SAW
Filed Dec. 24, 1927   2 Sheets-Sheet 2
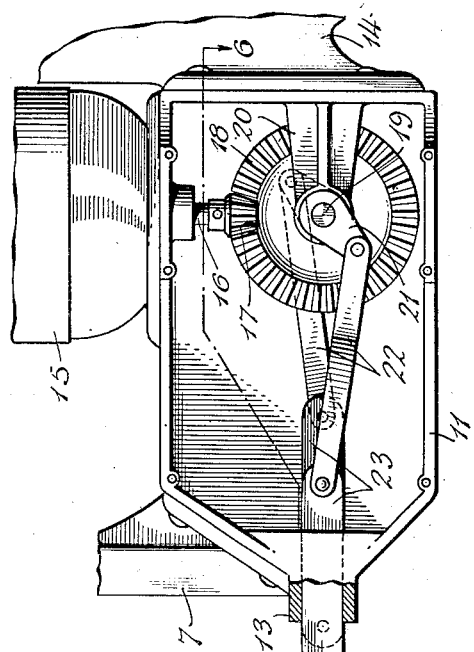
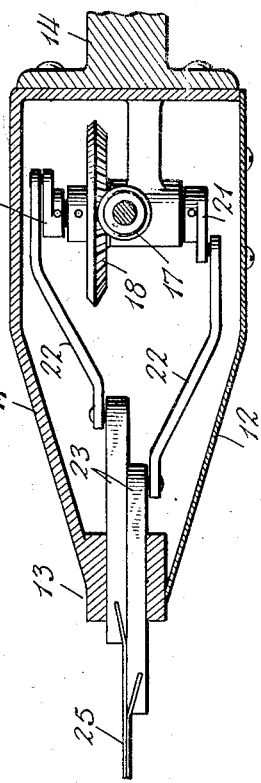
Fig. 5.
Fig. 6.
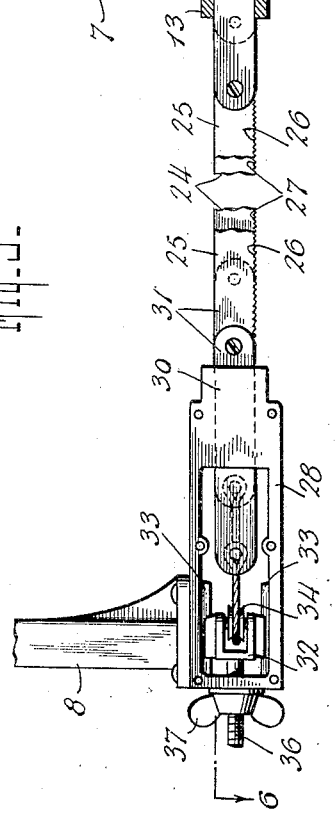
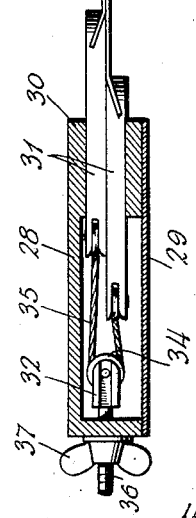
INVENTOR
JEAN B. BROILLET
BY
ATTORNEY Patented Jan. 20, 1931

1,789,804

UNITED STATES PATENT OFFICE

JEAN B. BROILLET, OF BROOKLYN, NEW YORK, ASSIGNOR OF ONE-THIRD TO IRWIN ROSENTHAL AND ONE-THIRD TO SAMUEL HIRSCHHORN

SAW

Application filed December 24, 1927. Serial No. 242,335.

This invention relates to improvements in saws and has particular reference to a saw of the reciprocating type.

An object of the invention is to operate a pair of cutting blades in conjunction with each other to form a single kerf or cut with the cutting teeth of each blade all arranged so as not to intersect the plane of the other blade.

Another object is to dispose a pair of a co-operating blades in abutting relation and to provide the teeth of each blade with a set, which extends only in a lateral direction away from the other blade, and with the teeth of the two blades pitched in opposite directions.

Another object is to provide an improved saw of simple and practical construction wherein a pair of cutting blades are combined to form a single kerf and reciprocated relative to a supporting frame to effect the cutting operation.

A further object is to reciprocate a pair of abutting cutting blades simultaneously in opposite directions and to guide said blades in their movements so that the same will be constantly maintained in their abutting relationship.

The above and other objects will appear more clearly from the following description when taken in connection with the accompanying drawings, which illustrate a preferred embodiment of the inventive idea.

In the drawings,

Fig. 1 is a side elevation partly in section, of the saw constructed in accordance with the invention.

Fig. 2 is a top plan view thereof.

Fig. 3 is an enlarged fragmentary elevation of the cutting blades.

Fig. 4 is a section on the line 4—4 of Fig. 3.

Fig. 5 is an enlarged fragmentary side elevation of the saw with parts removed to illustrate the operating mechanism.

Fig. is a section on the line 6—6 of Fig. 5.

The saw, in its preferred form, is shown as comprising a supporting frame including angular sections 7 and 8 having adjacent ends adjustably mounted in a connecting sleeve 9 to vary the length of the frame for the purpose of accommodating cutting blades of different lengths, said sections, being secured in adjusted positions by set screws 10.

At the end of the section 7, the same has connected thereto a casing 11 provided with a removable cover plate 12, one end of the casing being tapered and terminating in guide 13 for a purpose which will appear in the course of the description. The opposite end of the casing is provided with a handle 14 of somewhat the usual construction in saws of this type.

An electric motor conventionally shown at 15 is secured to the top of the casing 11 and also to the handle 14, if desired, and has its shaft 16 extending downwardly into said casing where it has affixed thereto a bevel pinion 17. This pinion meshes with a bevel gear 18 revolubly supported by the shaft 19 journaled in a bracket 20 extending from the rear wall of the casing 11. The ends of the shaft 19 carry the crank arms 21 extending in opposite directions from the shaft and each having connected thereto one end of a pitman rod 22. These rods converge toward the guide 13 and at their opposite ends each is pivotally connected to one of a pair of slides 23 mounted for reciprocation in the guide 13 and extending outwardly beyond the same. By reason of the disposition of the crank arms 21, it will be obvious that continuous rotation of the shaft 19, driven from the motor 15, will impart a reciprocatory movement to the slides 23 in opposite directions relative to each other.

A pair of cutting blades 24 and 25 having rows of teeth 26 and 27, respectively, are preferably disposed in abutting relation throughout practically their entire lengths and have adjacent ends each secured in one of the slides 23 so that the motion of the latter will be imparted to said blades to produce a simultaneous operation thereof in opposite directions. As is customary with blades of the general character used, the teeth of each of them has what is known as a set, that is, the teeth are arranged to project laterally at some-what of an angle to the plane of the blade in order that the kerf made by the blade will be wider than the thickness of said blade. Usually, the set is formed by alternately bending the teeth in opposite directions but in the present invention, principally owing to the fact that two blades are used, the teeth of each blade are bent only in one direction. In this manner, when the two blades are opposed to each other, the set of each blade extends outwardly and away from the other blade so that they will not intersect the plane of the latter blade. Thus the sets of the two blades combine to form what might be termed a double set which will be effective in cutting a kerf without undue friction upon the blades or the material being out. Also, as shown in Fig. 4, the teeth are all tapered and certain teeth of each blade (every fourth one) has its inner face in abutting relation to the corresponding face of the opposed tooth of the other blade. Thus the two opposed teeth have their outer faces, in upwardly diverging relation and owing to this disposition thereof, said teeth will co-operate, as the blades are reciprocated through a kerf, to aid in maintaining said blades in close contact with each other by reason of the pressure on outer surfaces. Between the abutting teeth, the other teeth of each blade are bent to diverge outwardly from the other blade and the angle of divergence varies with each succeeding tooth. Furthermore, in order to secure the greatest rapidity of cutting action, the teeth 26 and 27 of the respective blades are pitched in opposite directions so that as the blades are reciprocated, a cutting stroke will be so accomplished by either one or the other.

The end of the section 8 of the supporting frame carries a casing 28 which may be provided with a removable cover plate 29 and which is provided at its inner end with a guide portion 30 alined with the guide 13 of the casing 11. In said portion 30 there are disposed in staggered relation the two slides 31, parts of which extend outwardly from the casing and have their outer ends each secured to one of the blades 24 or 25.

Means are provided in connection with the slides 31 to maintain the blades 24 and 25 under tension so that the same will at all times be kept in abutting relation and thus operate most effectively in forming a single kerf. Said means is shown as comprising a bearing block 32 slidably mounted in guides 33 extending longitudinally of the casing 28. This block supports a pulley 34 around which extends a flexible element 35 the ends of which are connected each to one of the slides 31 at its inner end. A threaded rod 36 is carried by the block 32 and projects through the adjacent wall of the casing 28 with the projecting portion of said rod having a wing nut 37 threaded thereon and adapted to engage said casing. With such arrangement, a turning of the nut in the proper direction will move the block 32 longitudinally in the casing 28 to tauten or loosen the flexible element 35 and this adjustment will, in turn, vary the tension of the cutting blades 24 and 25.

A convenient manner of controlling the motor 15 may be provided in the form of a switch 38 located in the recess of the handle 14, as shown in Fig. 1, and having the line conductor 39 connected thereto and to the motor in the usual manner.

What is claimed is:

In a saw, a frame, a casing at each end thereof, a pair of slides movable in each casing with slides of each pair in opposed relation to one of the other pair, cutting blades secured to opposed slides, means in one of said casings for reciprocating the slides therein in opposite directions relative to each other, guides in the other casing, a bearing block slidably engaged with said guides, a pulley carried by said block, a flexible element connected to the slides in the latter casing and extending around said pulley, and means to adjust said block to positions along said guides to vary the tension on said flexible element.

JEAN B. BROILLET.